US006067562A

United States Patent [19]

Goldman

[11] Patent Number: 6,067,562

[45] Date of Patent: May 23, 2000

[54] SYSTEM AND METHOD FOR DOWNLOADING MUSIC SELECTIONS

[76] Inventor: Robert J. Goldman, 841 Windsor Hills Cir., San Jose, Calif. 95123

[21] Appl. No.: 09/153,149

[22] Filed: Sep. 14, 1998

Related U.S. Application Data

[63] Continuation of application No. 08/819,497, Mar. 17, 1997, Pat. No. 5,809,246, which is a continuation of application No. 08/186,302, Jan. 25, 1994, Pat. No. 5,629,867.

[51] Int. Cl.[7] .............................. G06F 13/00

[52] U.S. Cl. .............................. 709/206

[58] Field of Search .............................. 364/DIG. 1, DIG. 2; 369/2; 381/77; 704/200; 709/203, 206, 217, 219, 233, 228; 348/3, 6; 705/26

[56] References Cited

U.S. PATENT DOCUMENTS

| | | | |
|---|---|---|---|
| 5,129,036 | 7/1992 | Dean et al. | 704/200 |
| 5,168,481 | 12/1992 | Culbertson et al. | 369/2 |

*Primary Examiner*—Robert B. Harrell

*Attorney, Agent, or Firm*—Gray Cary Ware & Freidenrich LLP

[57] ABSTRACT

A digital radio broadcast station which includes a common digital database having stored therein a plurality of at least several hundred (preferably at least 1800) different selections of music to be played and broadcast by the radio station. A processor system is provided for programming the operation of the digital radio broadcast station with a sequence of music selections, which are subsequently retrieved in order from the common digital database and played over the digital radio broadcast station. The processor system preferably includes a main computer system for operating the radio station, and also a backup computer system for operating the radio station in the event of a failure of the main computer system. The processor system is preferably based upon reduced instruction set computing architecture, and preferably comprises an IBM RS/6000 system with an AIX operating system. The common digital database comprises a disk array storage, preferably a dual port RAID disk array. The digital radio broadcast station also includes a plurality of work station consoles for use by personnel responsible for operating the radio station such as disc jockeys and engineers.

8 Claims, 2 Drawing Sheets

SYSTEM AND METHOD FOR DOWNLOADING MUSIC SELECTIONS

This is a continuation of Ser. No. 08/819,497, filed on Mar. 17, 1997, now U.S. Pat. No. 5,809,246, which is a Continuation of prior application Ser. No. 08/186,302, filed on Jan. 25, 1994, now U.S. Pat. No. 5,629,867, entitled DIGITAL AUDIO SYSTEM FOR RADIO STATIONS.

BACKGROUND OF THE INVENTION

1. Field of the Invention

The present invention relates generally to a digital audio system for radio stations, and more particularly pertains to a programmable digital audio system for radio stations wherein the music to be played and broadcast over the radio station is stored in a digital database from which it is recalled pursuant to prior programming of the operation of the radio station.

2. Discussion of the Prior Art

Recording of audio music has progressed significantly over the past decade. The introduction of digital audio music has created a revolution in the quality of sound available for home users and for radio stations nationwide. The compact disk has become the standard for high quality digital audio, and has had a high acceptance rate in the marketplace.

In a typical prior art radio station environment, the disks to be played and broadcast are located and retrieved from a CD musical library. The disks are then loaded into a CD player, the music cued to play, and subsequently the disks are returned to the library after play, actions which require time, labor, money and space. With the latest developments in computer technology, many of these steps can be eliminated to result in bottom-line savings to a commercial radio station.

SUMMARY OF THE INVENTION

Accordingly, it is a primary object of the present invention to provide a digital audio system for radio stations wherein the broadcast music is stored in a digital database to provide a programmable radio station.

The concept of the present invention is relatively straightforward; instead of having the music exist on compact disks, the music is stored in a common digital database which is present in a computer system. The operator only needs to point an arrow at the name of the desired song to be played, press a button and the music is then immediately played in full digital sound. The order of the songs can be programmed in advance and played without staff intervention. Commercials and station promotions can be inserted as needed.

The database is created by loading desired CD tracks from the station CD library once, and additional songs can be loaded as necessary. Once the database is created, the compact disks need not be used again; all music is played directly from the database.

Another feature of the present invention improves the system operation and performance even more. If a song is not available in the radio station's database, it can be transmitted to the system upon request over a telecommunications link that provides music from a master library database to the station's system.

Each system can be customized to the station's operational procedures. The system can adapt current forms and provide any reports that the station currently requires, and station logs can be maintained automatically. All required FCC logs can be automatically recorded, summarized, and printed as required.

The present invention provides substantial cost savings in the operation of a commercial radio station in the following areas:

In staffing, fewer people are required for the station operation. Compact disks no longer need to be taken from the library and returned after each play. People are not needed to cue songs to play, as it is automatically handled by the system of the present invention.

In space savings, large music libraries are no longer necessary. Music is loaded once in advance into the system, and the source of the music (e.g., CD) need not be stored or saved.

In equipment savings, fewer tape/CD players are necessary, resulting in dramatic maintenance cost savings.

In efficiency, the system of the present invention is very easy to operate. The person in charge of programming selects the music to be played and places the music in a desired program order. A prior day's program can be used as a guide in planning future programming. The system then validates the selections and requests the loading of any material not present either by tapes/CD's or by downloading if available. Work station consoles are available throughout the station for use by engineers, DJ's and others responsible for station operation.

In reliability, a backup computer system automatically takes over for the primary computer system in case of failure. All music in the database can have a second standby copy available and backup power to take over in an emergency, to operate the system in a fail-safe mode.

Listener response can also be implemented into the digital audio system for radio stations of the present invention. A listener call-in number can be tied into the system so that requested songs can be automatically played. Songs can be selected by a touch-tone phone without involving station personnel. A connection can also be made available to local interactive cable TV networks such that subscribers can have the same capabilities via the television set. Listener demographic information can be easily collected, which can be used for advertising, promotional, or programming purposes.

The system of the present invention revolutionizes the way that radio stations operate. Ease of use, cost savings, and increased station efficiency provide a quick return to the station. Additional features and options such as user call-in via telephone or interactive cable television provide tremendous marketing opportunities resulting in more listeners and higher advertising revenues.

In accordance with the teachings herein, the present invention provides a digital radio broadcast station which includes a common digital database having stored therein a plurality of at least several hundred different selections of music to be played and broadcast by the radio station. A processor system is provided for programming the digital radio broadcast station with a sequence of music selections, which are subsequently retrieved in order from the common digital database and played over the digital radio broadcast station.

In greater detail, the processor system includes a main computer system for operating the radio station, and also a backup computer system for operating the radio station in the event of a failure of the main computer system. In that regard, a fiber optic cable connects the main computer system with the backup computer system for switching between the main and backup computer systems. The processor system is preferably based upon Reduced Instruction Set Computing (RISC) architecture. The processor system preferably comprises an IBM RS/6000 system with an AIX operating system, and also includes first and second disk drive controllers. The common digital database comprises a disk array storage, preferably a dual port RAID disk array. The digital radio broadcast station also includes a plurality of work station consoles for use by personnel responsible for operating the radio station such as disc jockeys and engineers. A bridged network which may include a modem is also provided for connecting the radio station to a further digital database for music selections not stored in the common digital database. The processor system is provided with a connection to a telephone network, such that radio station callers can communicate with the radio station by a touch tone telephone. The processor system is also provided with a connection to an interactive cable television network, such that cable television viewers can communicate with the radio station over the interactive cable television network.

The present invention also provides a method for operating a radio station which includes digitally storing in a common digital database, of a computer system, a plurality of at least several hundred different selections of music which is to be played and broadcast by the radio station. Pursuant to the method, the computer system is programmed with a sequence of music selections to be played by the radio station, and the programmed sequence of music selections is subsequently retrieved from the common digital database and broadcast over the radio station.

The method of operation preferably utilizes a main computer system for operating the radio station and a backup computer system for operating the radio station in the event of a failure of the main computer system, with the processor systems preferably being based upon reduced instruction set computing architecture. The main computer system and the backup computer system are connected by a fiber optic cable connection for switching between the main and backup computer systems. The method of operation of the radio station also provides a plurality of work station consoles for use by personnel responsible for operating the radio station, such as disc jockeys and engineers. In greater detail, the step of digitally storing includes digitally storing the plurality of at least several hundred different selections of music in a disk array, preferably a dual port RAID disk array. The method of operation of the computer system also provides a bridged network which may include a modem for connecting the radio station to a further digital database for music selections not stored in the common digital database. The method for operating the radio station also includes inserting commercials and station promotions into the sequence of music selections to be played by the radio station. The method of operation of the radio station also provides a connection to a telephone network, such that radio station callers can communicate with the radio station by a touch tone telephone, and further provides a connection to an interactive cable television network, such that cable television viewers can communicate with the radio station over the interactive cable television network. The method of operation of the radio station also provides a plurality of work station consoles for use by personnel responsible for operating the radio station such as disc jockeys and engineers. The step of digitally storing includes storing the plurality of at least several hundred different selections of music in a disk array, preferably a dual port RAID disk array.

Pursuant to the teachings of the present invention, the common digital database, either at the radio station or provided elsewhere, can also be used to provide an audio on demand service or system. In the audio on demand system, a communications network is provided to users, wherein a user communicates with the computer system over the communications network to indicate a choice of one or more music selections. The choice of one or more music selections is then retrieved from the common digital database and transmitted over the communications network to the user.

In greater detail, the communications network can be provided by a telephone system, wherein a user communicates with the computer system by a touch tone telephone to indicate a choice of one or more music selections, and the one or more music selections are then transmitted over the telephone system to the caller. The communications network can also be provided by an interactive cable television network, wherein a user communicates with the computer system over the interactive cable television network to indicate a choice of one or more music selections, and the one or more music selections are then transmitted over the interactive cable television network to the user.

BRIEF DESCRIPTION OF THE DRAWINGS

The foregoing objects and advantages of the present invention for a digital audio system for radio stations may be more readily understood by one skilled in the art with reference being had to the following detailed description of several preferred embodiments thereof, taken in conjunction with the accompanying drawings wherein.

DETAILED DESCRIPTION OF THE DRAWINGS

Figure 1:
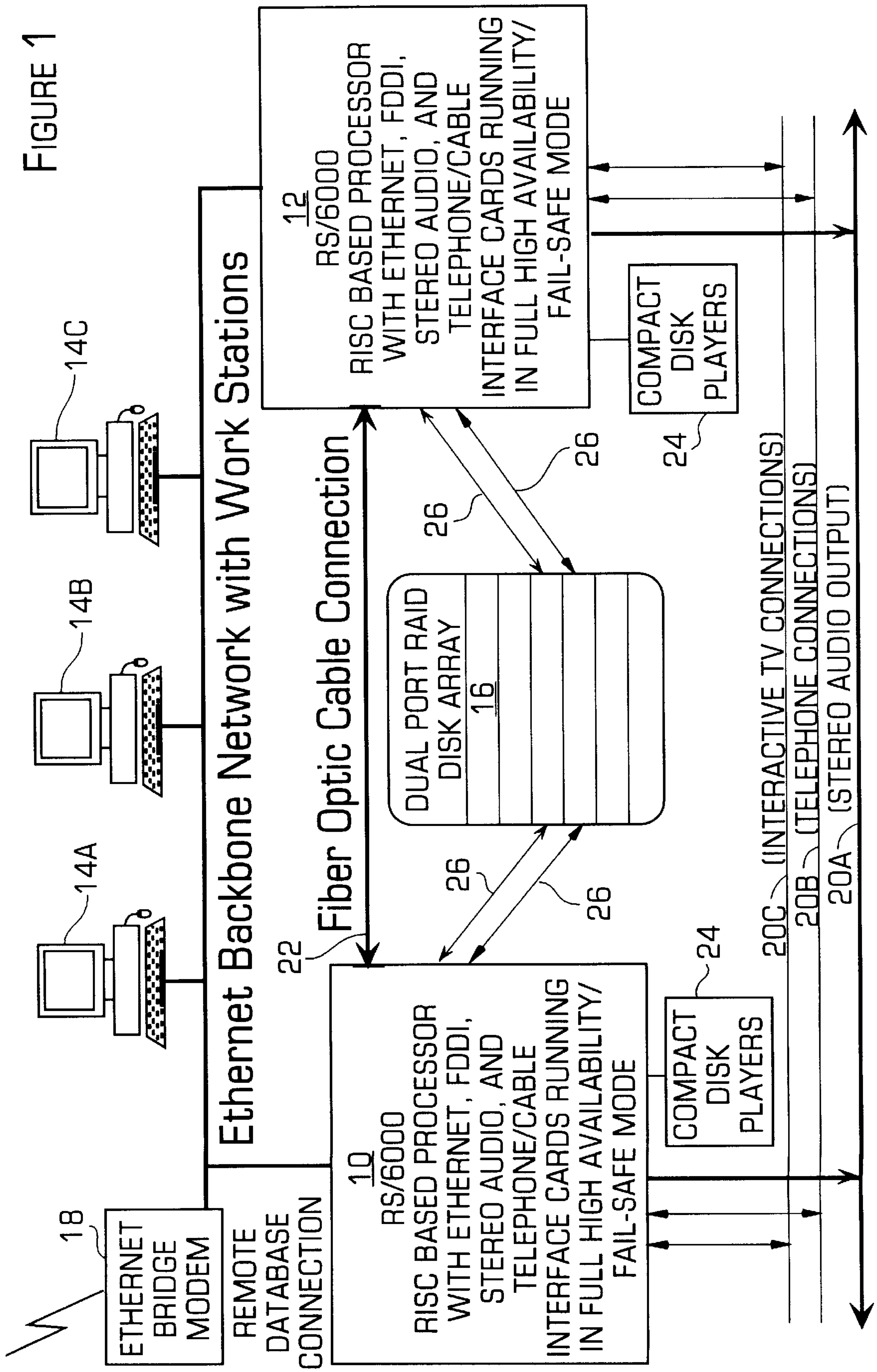
FIG. 1 is a block diagram of an exemplary embodiment of a digital audio system for radio stations constructed pursuant to the teachings of the present invention.

A digital audio system for radio stations pursuant to the teachings of the present invention can be implemented with the computer hardware illustrated in FIG. 1, which shows one preferred embodiment of a Local Area Network (LAN) for a digital audio system for a radio station. The Local Area Network includes a first RS/6000 processor 10, a second redundant RS/6000 processor 12, a plurality of work stations 14*a*, 14*b*, 14*c*, a Dual Port RAID Disk Array 16, an Ethernet bridge and modem 18 to connect the LAN to a Wide Area Network (WAN), and connections 20*a* for stereo audio outputs to the radio station transmitter, 20*b* to telephone lines, and 20*c* to interactive cable television systems.

Pursuant to the teachings of the present invention, at least one processor 10 is required, but to provide for optimum performance, a processor system based on RISC (Reduced Instruction Set Computing) architecture using two processors 10, 12 is preferred. The processors 10, 12 accommodate the retrieval and output of music stored in memory while providing multiple users concurrent access to the system.

The processor system supports a high-availability processing mode so if one processor system 10 fails, the other processor system 12 immediately takes over without interruption, which is accomplished via a fiber optic cable 22 linking the two processor systems.

The processor systems 10, 12 preferably provide hardware support for the output stereo audio, and preferably are provided with input/output connections based upon SCSI (Small Computer System Interface), which allows connection of multiple compact disk and disk storage units 24 (up to eight) as required.

The processor systems 10, 12 support Ethernet or Token Ring protocols to allow for the connection of multiple terminal devices, such as the work stations 14, and also to provide access to remote databases, as by a bridged network which may include a modem 18, in a Wide Area Network (WAN).

The processor systems 10, 12 are preferably provided with multiple redundant connections 26 to the disk system 16 to minimize the possibility of system failure, and with connections 20*b*, 20*c* to telephone and cable networks to provide for listener opinions and requests.

Based upon commercially available equipment, a preferred processor which fulfills the requirements of the present invention is the RS/6000 system manufactured by IBM Corporation with the following components:

a. 2 Gigabytes of disk storage in the processor;

b. a SCSI (Small Computer System Interface) Differential Controller (to provide for connections 26 to the disk drives);

c. 128 Megabytes of main memory;

d. FDDI (Fiber Data Distributed Interchange) which is a Fiber adapter (single ring) port for fiber optic connections 22 between the two processors;

e. Audio capture/playback adapter (audio output from machine to 20*a*);

f. Digital tape drive with 5.0 gigabyte capacity for system backup (such as is available in Sony camcorders);

g. 4 (minimum) CD-ROM drives;

h. a communications adapter which is for a separate circuit card for connections to telephone/cable systems.

Although not recommended, the dual RISC configuration can be replaced by a single processor or by one based upon a different architecture such as a personal computer. However, if this substitution is made, poor system performance or reliability may result.

Regarding the disk storage 16, the primary requirement for the disk storage is that an on-line database of at least 30 gigabytes be available at any time. This amount of disk allows for the storage of approximately 1800 songs; additional storage can be added as required. The disks are configured so that if one disk unit fails, the system continues operation without interruption.

Additional hardware requirements include:

a. A second disk drive controller to take over in the event that the first disk drive controller fails;

b. Access to the disk drive unit from both processors;

c. Automatic duplication of all data onto a backup disk drive unit; and d. The ability to easily replace failed components without system downtime.

These requirements are preferably met by a disk technology called RAID (Redundant Array of Inexpensive Disks). Using RAID, any storage subsystem component or processor can fail without affecting the overall operation of the system. The RAIDIANT ARRAY product, available commercially from IBM, when equipped with an additional array controller, fulfills these hardware requirements.

Each work station 14 preferably consists of a 19-inch terminal display and a mouse connected via Ethernet or Token Ring to the main computer system. A minimum of three work stations 14*a*, 14*b*, 14*c* would generally be required to be used by the following individuals:

a. Station Manager—responsible for selecting and sequencing music and reviewing FCC logs produced by the system;

b. Engineer—responsible for loading system database and monitoring station operation;

c. On-Air Personality (DJ)—responsible for integrating the music sequence into an on-air program.

Each work station 14 display is preferably configured to the function to be performed. For example, the station manager's display can present programming options, while the engineer's display can present options relevant to the loading of music into the database. A primary feature of the system is that an individual with little computer experience can operate the work station easily as all input is entered by a graphical display.

Regarding communications equipment, the system preferably has a connection to optional remote databases via an Ethernet bridged network which may include a modem 18 and high speed data communication lines. This allows the system to access and download music which is not present in the digital database memory of the radio station's system.

Regarding computer software, particularly the operation system, when using the preferred RISC based processor configuration, a preferred operating system is AIX, commercially available from IBM Corporation, which provides support for the hardware and for easy system operation. Additional features of AIX include:

a. On-line access to system documentation;

b. Support, control and design of the graphical displays used to operate the system;

c. Support for a high-availability processing mode so that if one processor fails, a second processor takes over immediately;

d. The ability to access the music stored in digital form and then convert it to audio which is then broadcast by the radio station;

e. Communications support to allow access to remote systems and databases.

The database manager will generally be custom software written for a particular radio station. The database manager stores the music so that it is available to the radio station, provides the director listings to the user, and determines in which computer system the requested song is located. Due to the unique requirements of the system, the database manager would generally be specifically written for this application.

Figure 2:
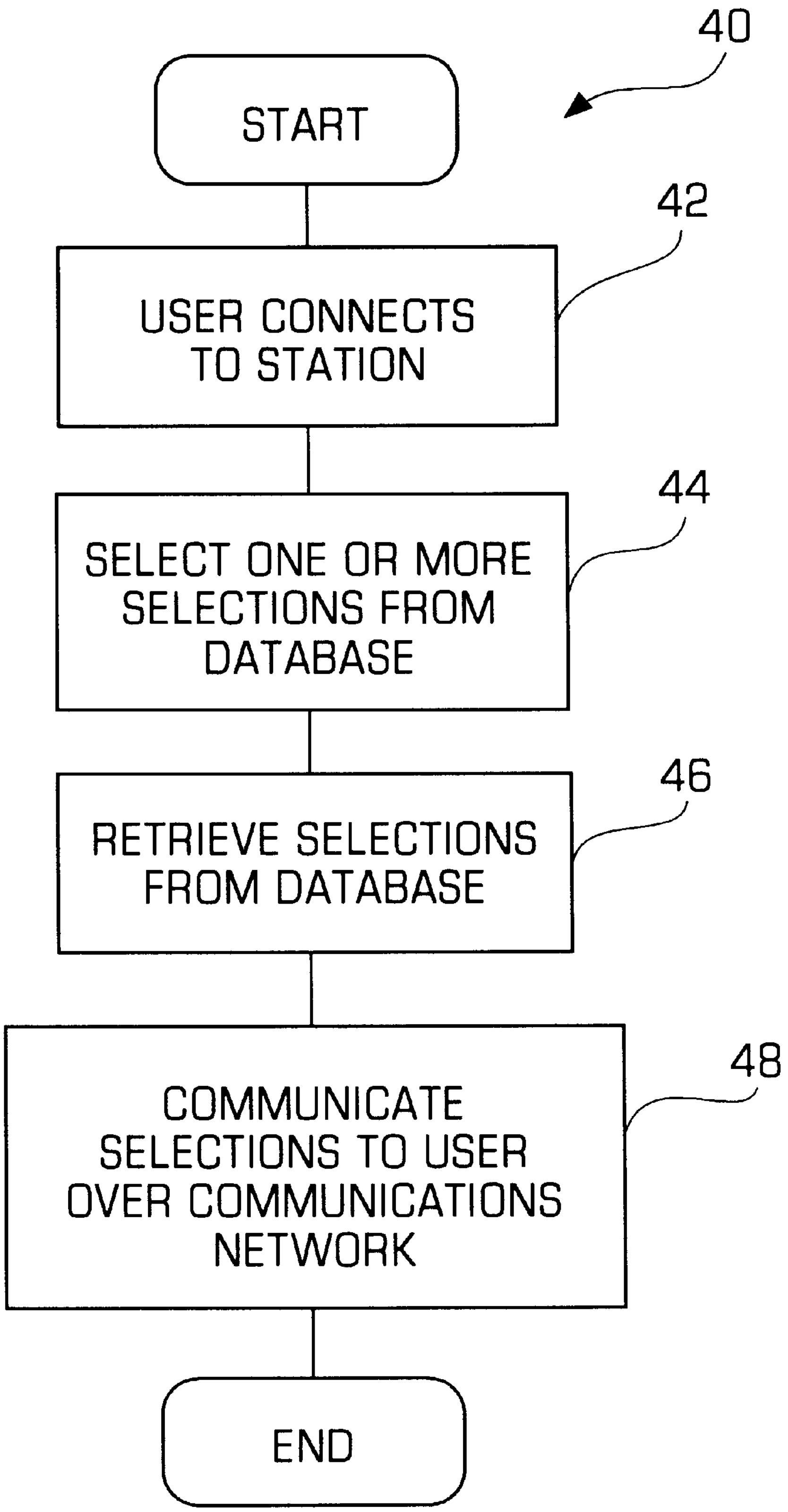
FIG. 2 is a flowchart illustrating a method for downloading one or more music selections in accordance with the invention.

FIG. 2 is a flowchart illustrating a method 40 for downloading one or more music selections in accordance with the invention. Generally, the method includes the steps of connecting the user to the system in step 42, the user selecting one or more music selections from the database in step 44 and the system retrieving the one or more music selections from the database in step 46. In step 48, the one or more music selections retrieved from the database are communicated to the user over the communications network so that the user may download one or more music selections from the database of the system in accordance with the invention.

While several embodiments and variations of the present invention for a digital audio system for radio systems are described in detail herein, it should be apparent that the disclosure and teachings of the present invention will suggest many alternative designs to those skilled in the art.

What is claimed is:

1. A system for providing a user with one or more music selections being played by a radio station, the system comprising:

a database for storing a plurality of music selections being played by the radio station;

a communications network for permitting a user to connect to the database and the radio station and to select one or more of the music selections from the database;

means for retrieving the one or more selections from the database; and means for communicating the one or more selections to the user over the communications network so that the user orders the music selections based on the music selections being played by the radio station.

2. The system of claim 1 further comprising means for receiving a play list of the music selections being played by the radio station, the play list comprising a portion of the music selections in the database and means for selecting the one or more music selections from the database based on the play list.

3. The system of claim 2, wherein the communications network comprises a telephone network.

4. The system of claim 2, wherein the communications network comprises an interactive cable television network.

5. A method for providing a user with one or more music selections based on the playlist generated by a radio station, the method comprising:

storing a plurality of music selections being played by the radio station in a digital database;

selecting one or more music selections from the digital database over a communications network;

retrieving the one or more selections from the digital database; and communicating the one or more selections to the user over the communications network so that the user orders the music selections based on the music selections being played by the radio station.

6. The method of claim 5 further comprising receiving a play list of the music selections being played by the radio station, the play list comprising a portion of the music selections in the database and selecting the one or more music selections from the database based on the play list.

7. The method of claim 6, wherein the communications network comprises a telephone network.

8. The method of claim 6, wherein the communications network comprises an interactive cable television network.

* * * * *